United States Patent Office 3,383,376
Patented May 14, 1968

3,383,376
PROCESS FOR THE POLYMERIZATION OF BUTADIENE-1,3 USING AS CATALYST A GROUP VIII METAL, METAL ALKYL AND CYCLOOCTADIENE - 1,5 AS A MOLECULAR WEIGHT REGULATOR
Ettore Giachetti, Milan, and William Bortolini, Bologna, Italy, assignors to Montecatini Edison S.p.A., Milan, Italy, a corporation of Italy
No Drawing. Filed Feb. 11, 1964, Ser. No. 343,935
Claims priority, application Italy, Feb. 13, 1963, 2,989/63
2 Claims. (Cl. 260—94.3)

ABSTRACT OF THE DISCLOSURE

Regulation of molecular weight of resulting polybutadiene-1,4 in polymerization of butadiene-1,3 in presence of catalysts obtained from Group VIII metal compounds and metal alkyl compounds by using cyclooctadiene-1,5 as the molecular weight regulator.

This invention relates to an improved process for the polymerization of butadiene-1,3 to polymers having a prevailingly or substantially 1,4-cis enchainment.

Previous patent applications Ser. No. 777,448 filed on Dec. 1, 1958 and Ser. No. 791,456 filed on Feb. 5, 1959 disclose the preparation of high molecular weight butadiene polymers having a prevailingly or substantially 1,4-cis enchainment, by polymerization in the presence of catalysts of compounds of Group VIII metals of the Periodic Table and of alkyl metal compounds, such as for instance aluminum dialkyl monohalides. In particular, cobalt compounds have been illustrated, preferably in solution in the solvent used as the polymerization medium. The thus obtained products are generally crystallizable under stretching at room temperature and have very good elastomeric properties.

It has been observed that, when polybutadiene is obtained with catalysts of this type, the molecular weight of the polybutadiene is inversely proportional to the amount of the Group VIII metal present in the catalyst and increases proportionally with the amount of the butadiene polymerized. Consequently, during the polymerization, a regular increase of the molecular weight is observed while the conversion proceeds. This characteristic of the polymerization process could be used to regulate the molecular weight of polybutadiene and to keep it within the desired limits.

The regulation of the molecular weight based on the amounts of the catalyst fed gives satisfactory results only if very pure starting materials are used in the polymerization. The catalyst, in fact, is very sensitive towards a great number of substances. Even very small amounts of air, water, alcohols, aldehydes, acids, oxygenated substances in general, sulfurated products, acetylene compounds, etc. are in fact sufficient to destroy the catalyst or to inactivate a portion thereof. Consequently, only a portion of the catalyst fed actually remains active and the average molecular weight of the polymer is therefore very different from that foreseen or desired.

In order to overcome the foregoing inconveniences, patent application Ser. No. 854,267 filed on Nov. 20, 1959, proposes to use unsaturated hydrocarbons which are scarcely or not at all polymerizable to high molecular weight polymers in the presence of the catalysts of compounds of the metals of Group VIII of the Periodic Table, such as ethylene, higher alpha-olefins and linear, nonconjugated dienes having adjacent pairs of double bonds, such as for instance allene and its derivatives or higher homologues. Said method, while providing good regulation of the molecular weight within wide limits, has some inconveniences owing to the fact that the substances used as regulators are not easily dosable since they are gaseous under normal conditions and under the conditions generally used in polymerization.

In accordance with the present invention, it has been found that it is possible to overcome all the above mentioned inconveniences and to regulate the molecular weight of polybutadiene in a simple and effective way by carrying out the polymerization of butadiene in the presence of cyclooctadiene-1,15. This diene not only allows a good regulation of the molecular weight within wide limits but also has the advantage of being a liquid under normal conditions (boiling point: 148.4° C. at 760 mm. Hg) and therefore it can be very easily dosed out, even in small amounts. Furthermore, it has been observed that the behavior of the cyclooctadiene-1,5 is surprisingly very different from that of other cyclic dienes, such as for instance cyclohexadiene-1,4. In fact, by using the cyclooctadiene as a molecular weight regulator a regular decreasing of the molecular weight, as a function of the amount of the added diene, is obtained, while on the other hand, no remarkable variation of the molecular weight is observed when cyclohexadiene is used. Furthermore, although the cyclooctadiene shows a great activity as a regulator (an addition of 0.5% by weight based on the weight of butadiene leads to a decrease of about 40% of the molecular weight of the obtained polybutadiene), it does not lead to any remarkable variation of the degree of conversion, nor of the content of 1,4-cis structure of the polymer.

The cyclooctadiene may be fed together with the butadiene or separately, either before the polymerization has begun or after the polymerization has started. In the latter case the action of reducing the molecular weight will obviously start when the addition is made and the molecular weight will be a little higher than that which would be obtained by introducing the cyclooctadiene at the start of the polymerization. By working in this manner, however, a remarkable reduction of the low polymer fraction in the product is obtained.

The catalysts which can be used in the process of the present invention are those of compounds, preferably soluble in the polymerization medium, of metals of Group VIII of the Periodic Table and of metal alkyl compounds, preferably alkylaluminumhalides, already described in previous patents.

The polybutadiene obtained with the aid of these catalysts has prevailingly or substantially a 1,4-cis structure and crystallizes at room temperature under stretching. It does not differ, therefore, from the polybutadiene obtained in accordance with the present invention, in the presence of the cyclooctadiene as a regulator of the molecular weight.

The invention will be better illustrated in the following examples which are given only as a further illustration of the invention and are not intended to limit the invention.

Example 1

The polymerization of butadiene was carried out at 0° C. by introducing the reactants (which will be hereinafter indicated) into glass bottles having a volume of about 180 cc., while taking care that the introduction was carried out under dry nitrogen. The bottles were then immediately closed, agitated by shaking, and immersed in crushed ice for a period of two hours. After the end of the polymerization, the contents of the bottles were discharged into methanol to coagulate the polymers, which were then dried under vacuum at 70° C. for 12 hours. Each test was contemporaneously carried out five times and the values indicated in the following table represent their average values.

Order of the introduction and amounts of the reactants:

| | | |
|---|---|---|
| Anhydrous toluene | cc | 120 |
| Diethylaluminummonochloride | g | 0.3 |
| Cyclooctadiene-1,5 | | Variable |
| Co (acetylacetonate) | mg | 3.6 |
| Butadiene (99.9%) | g | 12 |

The components of the catalyst were introduced as solutions in toluene (1 g./liter for the Co compound and 250 g./liter for the organometallic compound).

| Polymer | Cyclooctadiene-1,5, percent by wt. of the butadiene | | | | |
|---|---|---|---|---|---|
| | 0 | 0.5 | 1 | 1.66 | 5 |
| Conversion, percent | 78 | 73 | 75 | 75 | 55 |
| 1,4-cis, percent | 97.6 | 97.3 | 97.9 | 97.6 | 96.9 |
| Mooney viscosity ML (1+4) 100° C | >100 | 83 | 55 | 26 | 2 |
| Intrinsic viscosity in toluene at 26° C.[1] | 4.3 | 3.1 | 2.7 | 2.2 | 1.2 |
| Molecular weight [2] | 400,000 | 243,000 | 205,000 | 158,000 | 74,000 |

[1] The intrinsic viscosity was measured by means of a Bischoff viscosimeter.
[2] The molecular weight was determined from the intrinsic viscosity by means of the formula $(\eta) = 1.53 \times 10^{-4} \times M^{0.8}$ (Johnson and Wolfangel, Ind. Eng. Chem. 44, 752 (1952)).

Example 2

Comparative polymerizations were carried out in a 6 liter autoclave provided with agitator and cooling jacket cooled by expansion of liquid ammonia. The reactants were introduced into the autoclave in the order hereinafter described and the polymerizations were carried out at 15° C. for 4 hours. At the end of each run the contents of the autoclave were discharged into methanol to coagulate the polymer, which was thereafter dried under vacuum at 70° C., for 12 hours.

Order of introduction and amounts of the reactants:

| | | |
|---|---|---|
| Anhydrous toluene | cc | 4000 |
| Cyclooctadiene-1,5 | | Variable |
| Diethylaluminummonochloride | g | 10 |
| Co (acetylacetonate) | mg | 80 |
| Butadiene (99.9%) | g | 400 |

| Polymer | Cyclooctadiene-1,5, percent by wt. of the butadiene | | |
|---|---|---|---|
| | 0 | 0.5 | 1 |
| Conversion, percent | 75 | 72 | 73 |
| 1,4-cis, percent | 96.5 | 97.4 | 97.1 |
| Mooney viscosity ML (1+4) 100° C | >100 | 61 | 21 |

Example 3

The polymerization of butadiene was carried out at 0° C. by introducing the reactants (which will be hereinafter indicated) into glass bottles having a volume of about 180 cc., taking care that the introduction was carried out under dry nitrogen. The bottles were then immediately closed and agitated by shaking and immersed in crushed ice for a period of two hours. After the end of the polymerization, the contents of the bottles were discharged into methanol to coagulate the polymer which was then dried under vacuum at 70° C. for 12 hours. Each test was contemporaneously carried out five times and the values indicated in the following table represent the average values.

Order of introduction and amounts of the reactants:

| | | |
|---|---|---|
| Anhydrous toluene | cc | 120 |
| Diethylaluminummonochloride | g | 0.3 |
| Cyclohexadiene-1,4 (or cyclooctadiene-1,5) | | Variable |
| Co (acetylacetonate) | mg | 3.6 |
| Butadiene (99.9%) | g | 12 |

The components of the catalyst were introduced as solutions in toluene (1 g./liter for the Co compound and 250 g./liter for the organometallic compound).

The results are reported herebelow:

| | | | | |
|---|---|---|---|---|
| Cyclohexadiene 1,4 (percent by weight of the butadiene) | | | 2 | 3 |
| Cyclooctadiene 1,5 (percent by weight of the butadiene) | | 1.6 | | |
| Conversion, percent | 78 | 75 | 70 | 83 |
| Intrinsic viscosity in toluene at 26° C. (Bischoff viscosimeter) | 4.3 | 2.2 | 4 | 4 |

The runs hereabove show that while cyclooctadiene strongly reduces the molecular weight of the polymer, cyclohexadiene even if it is present in large amounts has practically no influence on the molecular weight.

Example 4

Example 3 was repeated under the same conditions except that cyclododecatriene-1,5,9 was used as the molecular weight regulator.

| | Cyclododecatriene (percent by weight of the butadiene) | | | | |
|---|---|---|---|---|---|
| | 0 | 1 | 2 | 4 | 20 |
| Conversion, percent | 100 | 100 | 100 | 100 | 100 |
| 1,4-cis content, percent | 96.2 | 95.1 | 96 | 94.9 | 95.1 |
| Mooney viscosity ML (1+4) 100° C | >100 | >100 | >100 | >100 | >100 |

The viscosity is so high and difficult to measure that its values are merely indicative.

What is claimed is:

1. In a process for the polymerization of butadiene-1,3 to polymers having a 1,4-cis structure with catalysts of compounds of metals of Group VIII of the Periodic Table and metal alkyl compounds, the improvement which comprises in carrying out the polymerization in the presence of cyclooctadiene-1,5, the amount of said cyclooctadiene being up to about 5% by weight, based on the weight of said butadiene.

2. In a process for the polymerization of butadiene-1,3 with catalysts of diethylaluminummonochloride and cobalt acetylacetonate, the improvement which comprises in carrying out the polymerization in the presence of cyclooctadiene-1,5, the amount of said cyclooctadiene being up to about 5% by weight, based on the weight of said butadiene.

References Cited

UNITED STATES PATENTS 3,005,811  10/1961  Youngman _____ 260—94.3
3,220,999  11/1965  Duck et al. _____ 260—94.3

JOSEPH L. SCHOFER, *Primary Examiner.*

R. A. GAITHER, *Assistant Examiner.*

UNITED STATES PATENT OFFICE
CERTIFICATE OF CORRECTION

Patent No. 3,383,376  May 14, 1968

Ettore Giachetti et al.

It is certified that error appears in the above identified patent and that said Letters Patent are hereby corrected as shown below:

Column 3, line 25, "(1952)" should read -- (1952)) --.
Column 4, lines 53 and lines 59 and 60, "comprises in carrying", each occurrence, should read -- comprises carrying --.

Signed and sealed this 4th day of November 1969.

(SEAL)
Attest:

Edward M. Fletcher, Jr.
Attesting Officer

WILLIAM E. SCHUYLER, JR.
Commissioner of Patents